(12) United States Patent
Girtman et al.

(10) Patent No.: US 10,829,319 B2
(45) Date of Patent: *Nov. 10, 2020

(54) ROBOTIC CARTON UNLOADER

(71) Applicant: Intelligrated Headquarters, LLC, Mason, OH (US)

(72) Inventors: Michael Girtman, O'Fallon, MO (US); Matthew Wicks, Saint Charles, MO (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/937,662

(22) Filed: Mar. 27, 2018

(65) Prior Publication Data

US 2018/0215560 A1 Aug. 2, 2018

Related U.S. Application Data

(63) Continuation of application No. 14/279,694, filed on May 16, 2014, now Pat. No. 9,969,573.

(Continued)

(51) Int. Cl.
*B65G 67/24* (2006.01)
*B65G 59/02* (2006.01)
(Continued)

(52) U.S. Cl.
CPC ............ *B65G 67/24* (2013.01); *B25J 9/0093* (2013.01); *B25J 11/00* (2013.01); *B25J 15/10* (2013.01); *B65G 59/02* (2013.01)

(58) Field of Classification Search
CPC . B25J 9/0093; B25J 11/00; B25J 15/10; B25J 15/0009; B25J 15/0004;
(Continued)

(56) References Cited

U.S. PATENT DOCUMENTS 1,570,256 A 1/1926 Hunt
1,939,193 A 12/1933 Winkler et al.
(Continued)

FOREIGN PATENT DOCUMENTS

AT 6630 U1 1/2004
CA 908092 A 8/1972
(Continued)

OTHER PUBLICATIONS

European Office Action for Application No. 15 718 033.2 dated May 7, 2018.
(Continued)

*Primary Examiner* — Lynn E Schwenning
(74) *Attorney, Agent, or Firm* — Alston & Bird LLP

(57) ABSTRACT

A robotic carton unloader for automatic unloading of cartons from a carton pile stacked within a trailer. In various embodiments, a robotic carton unloader may comprise a conveyor system, a manipulator movably attached to an end of a robotic positioner and configured to dislodge one or more cartons from a carton pile; and a frame comprising a bumper configured to be pressed against the carton pile below one or more cartons being dislodged from the carton pile by the manipulator to stabilize the carton pile below the one or more cartons being dislodged; and a shelf configured to catch the one or more cartons dislodged from the carton pile and guide the one or more cartons dislodged from the carton pile onto the conveyor system.

19 Claims, 5 Drawing Sheets

Related U.S. Application Data

(60) Provisional application No. 61/824,550, filed on May 17, 2013.

(51) Int. Cl.
*B25J 9/00* (2006.01)
*B25J 11/00* (2006.01)
*B25J 15/10* (2006.01)

(58) Field of Classification Search
CPC ..... B25J 15/0206; B25J 15/024; B65G 67/24; B65G 59/02; B65G 69/008; B65G 37/005
USPC ......... 414/795.4, 795.7, 795.9, 796.2, 796.4, 414/796.5, 796.6; 198/540, 562
See application file for complete search history.

(56) References Cited

U.S. PATENT DOCUMENTS

| | | |
|---|---|---|
| 2,030,063 A | 2/1936 | Halleck |
| 2,305,512 A | 12/1942 | Broekhuysen |
| 2,335,924 A | 12/1943 | Elholm |
| 2,596,265 A | 5/1952 | Manierre |
| 2,605,912 A | 8/1952 | Small et al. |
| 2,788,202 A | 4/1957 | Barrett |
| 3,498,676 A | 3/1970 | Cilles |
| 3,581,360 A | 6/1971 | Penn |
| 3,608,743 A | 9/1971 | Mosher |
| 3,651,963 A | 3/1972 | McWilliams |
| 3,715,043 A | 2/1973 | Weir |
| 3,836,021 A | 9/1974 | McWilliams |
| 3,837,510 A | 9/1974 | McWilliams |
| 3,850,313 A | 11/1974 | Rackman et al. |
| 3,853,230 A | 12/1974 | Schultz |
| 3,866,739 A | 2/1975 | Sikorski |
| 3,907,093 A | 9/1975 | Skibo |
| 3,929,378 A | 12/1975 | Frenyo et al. |
| 4,039,074 A | 8/1977 | Maxted |
| 4,044,897 A | 8/1977 | Maxted |
| 4,111,412 A | 9/1978 | Cathers |
| 4,167,792 A * | 9/1979 | Carnegie ................. F16J 12/00 2/16 |
| 4,181,947 A | 1/1980 | Krauss et al. |
| 4,192,551 A | 3/1980 | Weimer et al. |
| 4,194,269 A | 3/1980 | Reiche et al. |
| 4,229,136 A | 10/1980 | Panissidi |
| 4,236,625 A | 12/1980 | Smith et al. |
| 4,242,025 A | 12/1980 | Thibault |
| 4,252,495 A | 2/1981 | Cook |
| 4,273,506 A * | 6/1981 | Thomson ................. B25J 9/046 294/106 |
| 4,281,955 A | 8/1981 | McWilliams |
| 4,284,186 A | 8/1981 | Brouwer |
| 4,405,276 A | 9/1983 | Wiegand |
| 4,441,844 A | 4/1984 | Miller |
| 4,453,874 A | 6/1984 | Veldhuizen et al. |
| 4,536,980 A | 8/1985 | Fleming |
| 4,571,145 A | 2/1986 | Hunter |
| 4,597,707 A | 7/1986 | Cornacchia |
| 4,635,908 A | 1/1987 | Ludwig |
| 4,664,449 A | 5/1987 | Bärnthaler et al. |
| 4,678,073 A | 7/1987 | Anderson et al. |
| 4,687,428 A | 8/1987 | Martin et al. |
| 4,692,876 A | 9/1987 | Tenma et al. |
| 4,705,447 A | 11/1987 | Smith |
| 4,721,005 A | 1/1988 | Yoshiji et al. |
| 4,747,193 A | 5/1988 | Hashidate et al. |
| 4,792,995 A | 12/1988 | Harding |
| 4,802,377 A | 2/1989 | Keppler |
| 4,836,111 A | 6/1989 | Kaufmann |
| 4,884,848 A | 12/1989 | Wrulich et al. |
| 4,904,150 A | 2/1990 | Svensson et al. |
| 4,941,794 A | 7/1990 | Hara et al. |
| RE33,416 E | 10/1990 | Konishi et al. |
| 4,968,214 A | 11/1990 | Shiotani |
| 4,976,584 A | 12/1990 | Focke |
| 5,009,560 A | 4/1991 | Ruder et al. |
| 5,015,145 A | 5/1991 | Angell et al. |
| 5,067,867 A | 11/1991 | Ruder et al. |
| 5,088,873 A | 2/1992 | Ruder et al. |
| 5,096,367 A | 3/1992 | Winski |
| 5,108,255 A | 4/1992 | Cornacchia |
| 5,195,627 A | 3/1993 | Wyman |
| 5,200,679 A * | 4/1993 | Graham ............... B25J 15/0009 294/111 |
| 5,201,626 A | 4/1993 | Hansen |
| 5,222,857 A | 6/1993 | Hasegawa |
| 5,240,101 A | 8/1993 | Lemay et al. |
| 5,256,021 A | 10/1993 | Wolf et al. |
| 5,325,953 A | 7/1994 | Doster et al. |
| 5,388,948 A | 2/1995 | Jerome |
| 5,391,038 A | 2/1995 | Stewart |
| 5,400,896 A | 3/1995 | Loomer |
| 5,402,690 A | 4/1995 | Sekiguchi et al. |
| 5,403,142 A | 4/1995 | Stewart |
| 5,415,057 A | 5/1995 | Nihei et al. |
| 5,415,281 A | 5/1995 | Taylor et al. |
| 5,462,400 A | 10/1995 | Bonnet |
| 5,466,116 A | 11/1995 | Jerome |
| 5,476,358 A | 12/1995 | Costa |
| 5,509,630 A | 4/1996 | Bringuier |
| 5,524,747 A | 6/1996 | Wohlfahrt et al. |
| 5,549,191 A | 8/1996 | Itoh et al. |
| 5,560,733 A | 10/1996 | Dickinson |
| 5,605,432 A | 2/1997 | Fink et al. |
| 5,615,993 A | 4/1997 | Tanaka |
| 5,642,803 A | 7/1997 | Tanaka |
| 5,671,962 A * | 9/1997 | Otsuka ................. B25J 9/1612 294/119.1 |
| 5,685,416 A | 11/1997 | Bonnet |
| 5,694,753 A | 12/1997 | Dellinger |
| 5,697,753 A | 12/1997 | Aurora et al. |
| 5,701,989 A | 12/1997 | Boone et al. |
| 5,716,184 A | 2/1998 | Lowe et al. |
| 5,718,325 A | 2/1998 | Doster et al. |
| 5,738,487 A | 4/1998 | Schaede et al. |
| 5,743,705 A | 4/1998 | Eissfeller |
| 5,768,860 A | 6/1998 | Weaver |
| 5,769,204 A | 6/1998 | Okada et al. |
| 5,796,620 A | 8/1998 | Laskowski et al. |
| 5,799,806 A | 9/1998 | Cullity |
| 5,901,613 A | 5/1999 | Forslund |
| 5,913,655 A | 6/1999 | Maday |
| 5,918,723 A | 7/1999 | Schuitema et al. |
| 5,921,740 A | 7/1999 | Stewart |
| 5,944,469 A | 8/1999 | Theurer et al. |
| 5,984,621 A | 11/1999 | Letson |
| 5,997,240 A | 12/1999 | Focke et al. |
| 6,006,893 A | 12/1999 | Gilmore et al. |
| 6,116,841 A | 9/2000 | Iwasaki |
| 6,145,397 A | 11/2000 | Nzeadibe et al. |
| 6,210,095 B1 | 4/2001 | Hempel et al. |
| 6,234,737 B1 | 5/2001 | Young et al. |
| 6,234,745 B1 | 5/2001 | Pugh et al. |
| 6,238,175 B1 | 5/2001 | Gotz et al. |
| 6,269,933 B1 | 8/2001 | Schuitema et al. |
| 6,298,587 B1 | 10/2001 | Vollom |
| 6,408,225 B1 | 6/2002 | Ortmeier et al. |
| 6,412,621 B1 | 7/2002 | De Vree et al. |
| 6,434,448 B1 | 8/2002 | Kosaka et al. |
| 6,484,862 B1 | 11/2002 | Gilmore et al. |
| 6,502,877 B2 | 1/2003 | Schick et al. |
| 6,545,440 B2 | 4/2003 | Slater et al. |
| 6,629,018 B2 | 9/2003 | Mondie et al. |
| 6,629,594 B2 | 10/2003 | Nagel et al. |
| 6,634,686 B2 | 10/2003 | Hosokawa |
| 6,659,264 B2 | 12/2003 | Pelka |
| 6,823,985 B2 | 11/2004 | Gilmore et al. |
| 6,827,202 B2 | 12/2004 | Topmiller et al. |
| 6,860,531 B2 | 3/2005 | Sherwin |
| 6,923,085 B2 | 8/2005 | Nakano |
| 6,952,977 B2 | 10/2005 | Bohlken |
| 7,007,792 B1 | 3/2006 | Burch |
| 7,048,492 B2 | 5/2006 | Spatafora et al. |

(56) References Cited

U.S. PATENT DOCUMENTS

| | | |
|---|---|---|
| 7,090,067 B2 | 8/2006 | Shiesser et al. |
| 7,108,125 B2 | 9/2006 | Gilmore et al. |
| 7,168,910 B2 | 1/2007 | Keller |
| 7,296,835 B2 * | 11/2007 | Blackwell ............... B25J 9/104 |
| | | 294/106 |
| 7,387,485 B2 | 6/2008 | Dickey et al. |
| 7,415,321 B2 | 8/2008 | Okazaki et al. |
| 7,469,782 B2 | 12/2008 | Hutton |
| 7,641,043 B2 | 1/2010 | Vestergaard |
| 7,641,247 B2 | 1/2010 | Blonigan et al. |
| 7,648,329 B2 | 1/2010 | Chilson et al. |
| 7,748,761 B2 | 7/2010 | Simons |
| 7,950,710 B2 * | 5/2011 | Matsukuma ............ B25J 9/104 |
| | | 294/104 |
| 7,967,543 B2 | 6/2011 | Criswell et al. |
| 7,971,503 B2 | 7/2011 | Nakamura |
| 7,980,808 B2 | 7/2011 | Chilson et al. |
| 7,994,793 B2 | 8/2011 | Matsumoto et al. |
| 8,011,706 B2 | 9/2011 | Schmidt et al. |
| 8,075,243 B2 | 12/2011 | Chilson et al. |
| 8,086,343 B2 | 12/2011 | Slocum, III |
| 8,151,969 B2 | 4/2012 | Hoene |
| 8,162,362 B2 | 4/2012 | Braunschweiger et al. |
| 8,192,137 B2 | 6/2012 | Ross et al. |
| 8,210,791 B2 | 7/2012 | Chilson et al. |
| 8,262,334 B2 | 9/2012 | Christensen et al. |
| 8,287,017 B2 * | 10/2012 | Koyama ................. B25J 15/08 |
| | | 294/103.1 |
| 8,295,980 B2 | 10/2012 | Williamson |
| 8,302,960 B2 | 11/2012 | Kato et al. |
| 8,325,458 B2 | 12/2012 | Prahlad et al. |
| 8,449,624 B2 * | 5/2013 | Evans ...................... A61F 2/54 |
| | | 623/62 |
| 8,473,094 B2 | 6/2013 | Becker et al. |
| 8,522,540 B2 | 9/2013 | Runesson et al. |
| 8,562,276 B2 | 10/2013 | Helmner |
| 8,562,277 B2 | 10/2013 | Criswell |
| 8,599,531 B2 | 12/2013 | Sundar et al. |
| 8,651,794 B2 | 2/2014 | Pippin |
| 9,132,975 B2 | 9/2015 | Criswell |
| 9,393,686 B1 | 7/2016 | Bradski et al. |
| 9,555,982 B2 | 1/2017 | Girtman et al. |
| 9,604,797 B2 | 3/2017 | Heitplatz et al. |
| 9,605,215 B2 | 3/2017 | Lott et al. |
| 9,650,215 B2 | 5/2017 | Girtman |
| 9,725,257 B2 | 8/2017 | Schenning |
| 2001/0014268 A1 | 8/2001 | Bryson et al. |
| 2002/0079194 A1 | 6/2002 | Ydoate et al. |
| 2002/0092728 A1 | 7/2002 | Tanaka |
| 2002/0094258 A1 | 7/2002 | Iwasaki et al. |
| 2003/0111892 A1 | 6/2003 | Neilson et al. |
| 2003/0177688 A1 | 9/2003 | Renzi |
| 2003/0209407 A1 | 11/2003 | Brouwer et al. |
| 2004/0013506 A1 | 1/2004 | Guhr et al. |
| 2004/0020087 A1 | 2/2004 | Fleming |
| 2004/0071539 A1 | 4/2004 | Anater et al. |
| 2004/0093975 A1 | 5/2004 | Amparore et al. |
| 2004/0179924 A1 * | 9/2004 | Lundahl ................ B65G 59/02 |
| | | 414/416.01 |
| 2005/0131645 A1 | 6/2005 | Panopoulos |
| 2006/0133913 A1 | 6/2006 | Helmner |
| 2006/0158146 A1 * | 7/2006 | Tadano ................ B25J 15/0004 |
| | | 318/568.21 |
| 2006/0185963 A1 | 8/2006 | Wijngaarden et al. |
| 2006/0260911 A1 | 11/2006 | Eckert et al. |
| 2006/0272324 A1 | 12/2006 | Hedman |
| 2006/0280587 A1 | 12/2006 | Guerra et al. |
| 2007/0020069 A1 | 1/2007 | Hutton |
| 2007/0246328 A1 | 10/2007 | Reznik |
| 2008/0267756 A1 | 10/2008 | Echelmeyer et al. |
| 2009/0074546 A1 | 3/2009 | Christensen et al. |
| 2009/0110522 A1 | 4/2009 | Criswell |
| 2009/0110525 A1 | 4/2009 | Criswell et al. |
| 2010/0043587 A1 | 2/2010 | Broberg et al. |
| 2010/0074720 A1 | 3/2010 | Taylor |
| 2010/0092272 A1 | 4/2010 | Echelmeyer et al. |
| 2010/0104403 A1 | 4/2010 | Cho et al. |
| 2010/0162694 A1 | 7/2010 | Angleitner |
| 2010/0178137 A1 | 7/2010 | Chintalapati et al. |
| 2010/0178139 A1 | 7/2010 | Sundar et al. |
| 2010/0266381 A1 | 10/2010 | Chilson et al. |
| 2011/0072930 A1 | 3/2011 | Bayer et al. |
| 2011/0114444 A1 | 5/2011 | Butler et al. |
| 2011/0153082 A1 | 6/2011 | Franck et al. |
| 2011/0239806 A1 | 10/2011 | Markert |
| 2011/0320042 A1 | 12/2011 | Handelman et al. |
| 2012/0076629 A1 | 3/2012 | Goff et al. |
| 2012/0090957 A1 | 4/2012 | Byrne et al. |
| 2012/0105787 A1 | 5/2012 | Nechiporenko et al. |
| 2012/0106787 A1 | 5/2012 | Nechiporenko et al. |
| 2012/0207572 A1 * | 8/2012 | Enenkel ................ B65G 67/08 |
| | | 414/502 |
| 2012/0207577 A1 | 8/2012 | Stollery et al. |
| 2012/0253507 A1 | 10/2012 | Eldershaw et al. |
| 2012/0253511 A1 * | 10/2012 | Saeki ............... H01L 21/67742 |
| | | 700/245 |
| 2012/0259461 A1 * | 10/2012 | Yang .................... B62D 57/032 |
| | | 700/245 |
| 2013/0096713 A1 | 4/2013 | Takizawa et al. |
| 2013/0331949 A1 * | 12/2013 | Dehoff ..................... A61F 2/583 |
| | | 623/26 |
| 2014/0050557 A1 | 2/2014 | Criswell |
| 2014/0199142 A1 | 7/2014 | Criswell |
| 2014/0205403 A1 | 7/2014 | Criswell |
| 2014/0341881 A1 | 11/2014 | Deperthes et al. |
| 2015/0063973 A1 | 3/2015 | Girtman et al. |
| 2015/0298319 A1 * | 10/2015 | Guo ........................ B25J 9/104 |
| | | 74/490.06 |
| 2016/0266578 A1 | 9/2016 | Douglas et al. |
| 2017/0043957 A1 | 2/2017 | Gaille et al. |
| 2017/0096308 A1 | 4/2017 | Girtman et al. |
| 2017/0107055 A1 | 4/2017 | Magens et al. |
| 2017/0121134 A1 | 5/2017 | Girtman et al. |
| 2017/0248966 A1 | 8/2017 | Lutz et al. |
| 2018/0111765 A1 | 4/2018 | Wicks et al. |

FOREIGN PATENT DOCUMENTS

| | | |
|---|---|---|
| CA | 2143816 | 9/1996 |
| CH | 648806 A5 | 4/1985 |
| DE | 37 33 461 A1 | 4/1989 |
| DE | 197 19 748 A1 | 12/1998 |
| DE | 103 24 755 A1 | 9/2004 |
| DE | 20 2004 009 581 | 10/2004 |
| DE | 102010015299 A1 | 10/2011 |
| DE | 10 2010 033 115 | 2/2012 |
| EP | 0486043 A1 | 5/1992 |
| EP | 1052205 A1 | 11/2000 |
| EP | 1332683 A2 | 8/2003 |
| EP | 2 156 927 A1 | 2/2010 |
| EP | 2 444 341 A1 | 4/2012 |
| EP | 2 570 372 A1 | 3/2013 |
| EP | 2626181 A2 | 8/2013 |
| EP | 2805903 A1 | 11/2014 |
| EP | 3115322 A1 | 1/2017 |
| EP | 3133034 A1 | 2/2017 |
| EP | 3296236 A1 | 3/2018 |
| EP | 3444208 A1 | 2/2019 |
| GB | 2109337 A | 6/1983 |
| GB | 2327929 A | 2/1999 |
| JP | 56-052316 A | 5/1981 |
| JP | 5652316 A | 5/1981 |
| JP | 5756689 U | 4/1982 |
| JP | 5105235 | 4/1993 |
| JP | H05-105235 | 4/1993 |
| JP | H05-208731 | 8/1993 |
| JP | 6262561 | 9/1994 |
| JP | H09-301538 | 11/1997 |
| JP | 2003081443 A | 3/2003 |
| JP | 2004-289680 | 10/2004 |
| NL | 1011978 C2 | 11/2000 |
| WO | WO-9316582 A1 | 9/1993 |

(56) References Cited

FOREIGN PATENT DOCUMENTS

| WO | WO-96/30287 | | 10/1996 | |
|---|---|---|---|---|
| WO | WO-98/51598 | | 11/1998 | |
| WO | WO-01/51356 | | 7/2001 | |
| WO | WO-2004/050518 | | 6/2004 | |
| WO | WO-2006/121329 | | 11/2006 | |
| WO | WO-2008/091733 | A2 | 7/2008 | |
| WO | WO-2008/094164 | A1 | 8/2008 | |
| WO | WO-2008/153757 | A1 | 12/2008 | |
| WO | 2009/043151 | A1 | 4/2009 | |
| WO | WO-2009051723 | A1 | 4/2009 | |
| WO | WO-2010114754 | A1 | 10/2010 | |
| WO | WO-2011/129699 | | 10/2011 | |
| WO | WO-2012/016974 | A1 | 2/2012 | |
| WO | WO-2013/042184 | A | 3/2013 | |
| WO | WO-2013/117177 | A1 | 8/2013 | |
| WO | WO-2015/017444 | | 2/2015 | |
| WO | WO 2015/031668 | A1 | 3/2015 | |
| WO | WO 2015/187975 | * | 12/2015 | ............ B25J 13/08 |

OTHER PUBLICATIONS

European Search Report Application No. 15 83 5314 dated Apr. 10, 2018, 9 pages.
European Search Report Application No. EP 14 84 1152 dated Mar. 27, 2017, 5 pages.
International Preliminary Report on Patentability (Chapter II) received in connection with International Application No. PCT/US2014/053247; dated Dec. 17, 2015, 20 pages.
International Preliminary Report on Patentability received in connection with International Application No. PCT/US2014/048679; dated Aug. 5, 2015, 32 pages.
International Search Report and Written Opinion of International Searching Authority for International Patent Application No. PCT/US2016/060635 dated Mar. 7, 2017, 10 pages.
International Search Report and Written Opinion of International Searching Authority for International Patent Application No. PCT/US2017/042031 dated Nov. 3, 2017, 10 pages.
International Search Report and Written Opinion of International Searching Authority for International Patent Application No. PCT/US2017/042033 dated Oct. 18, 2017, 10 pages.
International Search Report and Written Opinion of the International Searching Authority for International Patent Application No. PCT/US2015/034240 dated Aug. 26, 2015, 18 pages.
International Search Report and Written Opinion received in connection with international application No. PCT/US2014/053247; dated Dec. 11, 2014, 7 pages.
International Search Report and Written Opinion received in connection with international application No. PCT/US2014/053252; dated Dec. 10, 2014, 6 pages.
International Search Report and Written Opinion received in connection with international patent application No. PCT/US2014/048679; dated Nov. 20, 2014, 18 pages.
Office Action for European Application No. 14 841 152.3 dated Feb. 20, 2018.
Office Action for European Application No. 15803243.3 dated Jan. 4, 2018, 9 pages.
Prieele, "The best way to unload a container . . . ", http://www.youtube.com/watch?feature=player_detailpage&v=Mc-IClyclgU, (Nov. 17, 2009), 1 page.
RTL Robotic Mixed Case Simulation, "http://robotics.wynrightcomivideos.php" (Dec. 12, 2012), 1 page.
RTL Robotic Tire Loading, "http://robotics.wynright.com/videos.php" (Dec. 12, 2012), 1 page.
RTL Robotic Truck Loading, "http://robotics.wynrightcom/videos.php" (Dec. 12, 2012), 1 page.
RTU Mixed Case, "http://robotics.wynrightcom/videos.php" (Feb. 11, 2013), 1 page.
RTU Robotic Truck Unloading 2, "http://robotics.wynright.com/videos.php" (Mar. 22, 2013), 1 page.
RTU Robotic Truck Unloading, "http://robotics.wynright.com/videos.php" (Dec. 12, 2012), 1 page.
RTU Window View 2, "http://robotics.wynrightcom/videos.php" (Feb. 11, 2013), 1 page.
RTU Window View, "http://robotics.wynright.com/videos.php" (Feb. 11, 2013), 1 page.
Extended European Search Report for European Patent Application No. 14797635.1 dated Oct. 25, 2016, 7 pages.
International Search Report and Written Opinion dated Jun. 15, 2015 for Application No. PCT/US2015/023744.
International Search Report and Written Opinion dated Sep. 12, 2014 for Application No. PCT/US2014/038513.
Extended European Search Report for Application No. 18248143.2, dated May 9, 2019, 8 pages.
Extended European Search Report for Application No. 18188523.7, dated Jan 18, 2019, 10 pages.
Office Action for U.S. Appl. No. 14/471,795 dated May 18, 2016, 23 pages.
Notice of Allowance for U.S. Appl. No. 14/471,688 dated Feb. 18, 2016, 8 pages.
Notice of Allowance for U.S. Appl. No. 14/471,795 dated Sep. 20, 2016, 7 pages.
Office Action for U.S. Appl. No. 15/591,154 dated Jan. 15, 2019, 8 pages.
Office Action for U.S. Appl. No. 15/383,110 dated Mar. 2, 2018, 9 pages.
Office Action for U.S. Appl. No. 15/591,154 dated Apr. 23, 2018, 15 pages.
Office Action for U.S. Appl. No. 14/471,795 dated Dec. 30, 2015, 9 pages.
Office Action for U.S. Appl. No. 15/344,183 dated Sep. 21, 2017, 5 pages.
Office Action for U.S. Appl. No. 15/383,110 dated Oct. 26, 2017, 10 pages.
Office Action for U.S. Appl. No. 14/279,694 dated Apr. 29, 2016, 9 pages.
Office Action for U.S. Appl. No. 14/279,694 dated Feb. 10, 2017, 11 pages.
Notice of Allowance for U.S. Appl. No. 14/279,694 dated Dec. 28, 2017, 5 pages.
Office Action for U.S. Appl. No. 14/279,694 dated Oct. 31, 2016, 10 pages.
Office Action for U.S. Appl. No. 14/279,694 dated Sep. 19, 2017 15 pages.
U.S. Appl. No. 61/754,630, filed Jan. 20, 2013 titled "Automated Truck Unloader for Unloading/Unpacking Product from Trailers and Containers".
Non-Final Rejection dated Feb. 27, 2020 for U.S. Appl. No. 16/059,325.
Advisory Action (PTOL-303) dated Nov 14, 2018 for U.S. Appl. No. 15/591,154.
Final Rejection dated Sep. 5, 2018 for U.S. Appl. No. 15/591,154.
Intention to Grant for European Application No. 15723788.4, dated Jan. 8, 2020, 5 pages.
Non-Final Rejection dated Apr. 23, 2018 for U.S. Appl. No. 15/591,154.
Non-Final Rejection dated Jan. 15, 2019 for U.S. Appl. No. 15/591,154.
Notice of Allowance and Fees Due (PTOL-85) dated Aug. 6, 2019 for U.S. Appl. No. 15/591,154.
Notice of Allowance and Fees Due (PTOL-85) dated May 6, 2019 for U.S. Appl. No. 15/591,154.
Notice of Allowance and Fees Due (PTOL-85) dated Sep 20, 2019 for U.S. Appl. No. 15/591,154.
Communication pursuant to Article 94(3) for European Patent Application No. 15803243.3, dated Apr. 30, 2020, 6 pages.
Katsoulas et al., Edge Detection in Range Images of Piled Box-Like Objects, 2004 [online] [retrieved May 13, 2020] retrieved from the Internet URL: https://www.researchgate.net/publication/4090356_Edge_detection_in_range_images_of_piled_box-like_objects, 6 pages.
Notice of Allowance and Fees Due (PTOL-85) dated Jun. 17, 2020 for U.S. Appl. No. 16/059,325.
Corrected Notice of Allowability dated Jul. 23, 2020 for U.S. Appl. No. 16/059,325.

(56) References Cited

OTHER PUBLICATIONS

Notice of Allowance and Fees Due (PTOL-85) dated Sep. 2, 2020 for U.S. Appl. No. 16/784,841.
Communication about intention to grant a European patent dated Sep. 8, 2020 for EP Application No. 18188523.7.

* cited by examiner

ROBOTIC CARTON UNLOADER

CROSS REFERENCE TO RELATED APPLICATIONS

This application is a continuation of U.S. application Ser. No. 14/279,694, filed May 16, 2014, which claims priority to U.S. Provisional Patent Application No. 61/824,550 filed May 17, 2013, entitled "Robotic Carton Unloader", the entire contents of which are incorporated by reference herein.

BACKGROUND

The present disclosure relates generally to an apparatus for handling products, and more particularly directed to an automatic case unloader designed to unload product, such as cardboard cases of various sizes, from within a trailer.

Trucks and trailers loaded with cargo and products move across the country to deliver products to commercial loading and unloading docks at stores, warehouses, and distribution centers. Trucks can have a trailer mounted on the truck, or can be of a tractor-semi trailer configuration. To lower overhead costs at retail stores, in-store product counts have been reduced, and products-in-transit now count as part of available store stock. Unloading trucks quickly at the unloading docks of warehouses and regional distribution centers has attained new prominence as a way to refill depleted stock.

Trucks are typically unloaded with forklifts if the loads are palletized and with manual labor if the products are stacked within the trucks. Unloading large truck shipments manually with human laborers can be physically difficult, and can be costly due to the time and labor involved. Consequently, a need exists for an improved unloading system that can unload bulk quantities of stacked cases and cargo from truck trailers more quickly than human laborers and at a reduced cost.

SUMMARY

Various embodiments include a robotic carton unloader for automatic unloading of cartons from a carton pile stacked within a trailer. In various embodiments, a robotic carton unloader may comprise a conveyor system, a manipulator movably attached to an end of a robotic positioner and configured to dislodge one or more cartons from a carton pile; and a frame comprising a bumper configured to be pressed against the carton pile below one or more cartons being dislodged from the carton pile by the manipulator to stabilize the carton pile below the one or more cartons being dislodged; and a shelf configured to catch the one or more cartons dislodged from the carton pile and guide the one or more cartons dislodged from the carton pile onto the conveyor system.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the present invention.

DETAILED DESCRIPTION

Figure 1:
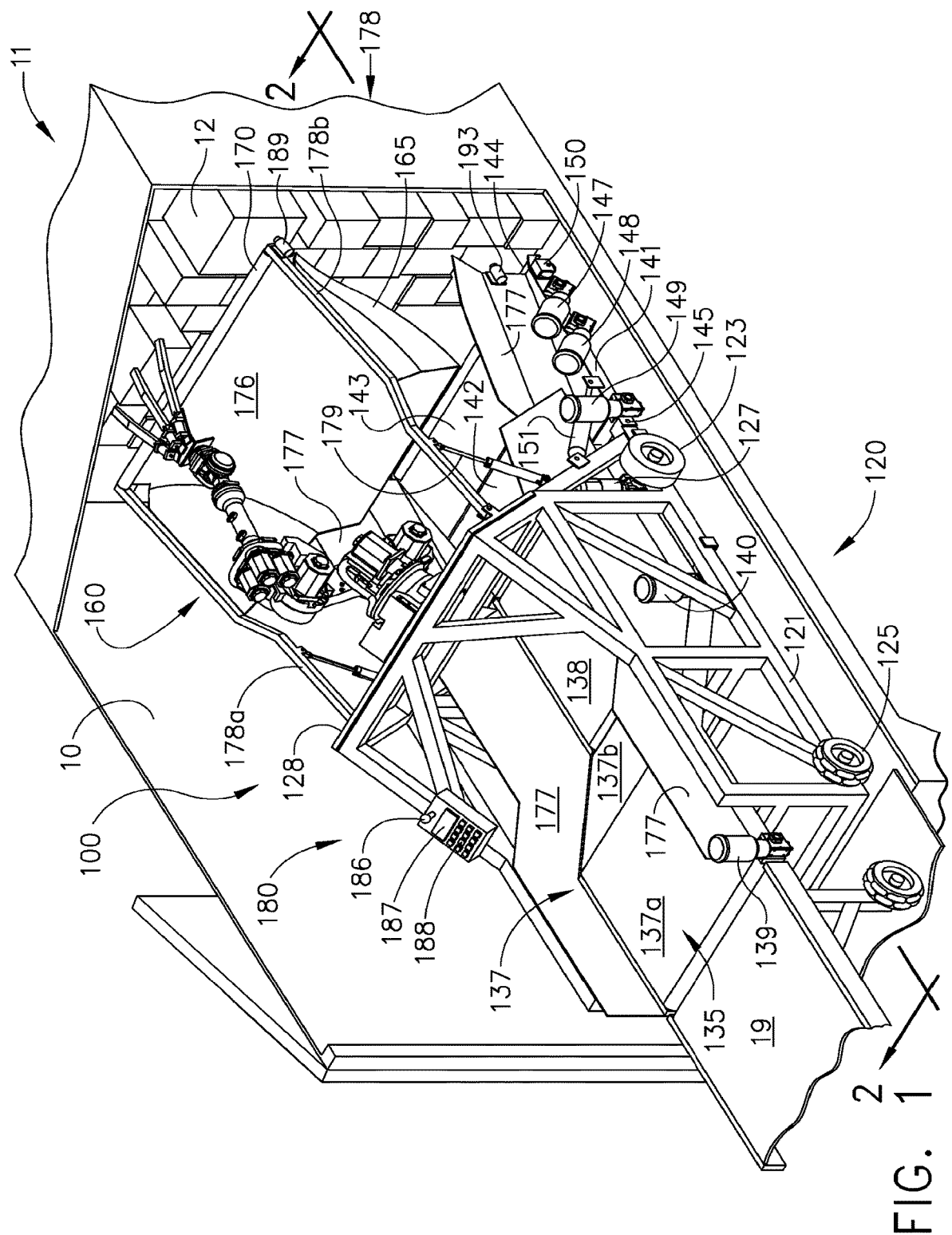
FIG. 1 is an isometric view of an embodiment of a robotic carton unloader maneuvering within a truck to unload product, such as cartons depicted as a pile of cartons, stacked within the truck.

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations. References made to particular examples and implementations are for illustrative purposes and are not intended to limit the scope of the invention or the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference.

The word "exemplary" is used herein to mean "serving as an example, instance, or illustration." Any implementation described herein as "exemplary" is not necessarily to be construed as preferred or advantageous over other implementations.

FIGS. 1-6 generally show an embodiment of a robotic carton unloader 100 for unloading cartons 12 from within a truck or semi-trailer 10. For instance, robotic carton unloader 100 may be configured to be driven into semi-trailer 10, dislodge or remove cartons 12 from carton wall or carton pile 11 stacked on floor 18 of semi-trailer 10, and transfer or unload the dislodged cartons 12 from semi-trailer 10. Cartons 12 may then be transferred into a store, warehouse or distribution center unloading bay. Cartons 12 may be any kind of product container for conveying products such as, but not limited to, cardboard cartons. Robotic carton unloader 100 may include a mobile body 120 sized and configured to be driven in and out of semi-trailer 10. Robotically controlled carton remover system 160 may be positioned on mobile body 120 and may extend from mobile body 120 toward carton pile 11 to dislodge and unload cartons 12 from carton pile 11. For instance, robotically controlled carton remover system 160 may dislodge and unload cartons 12 from a front and a top of carton pile 11. Carton guide system 175 may be located adjacent to (e.g., below) carton remover system 160 to catch cartons 12 as they are dislodged from pile 11. Carton guide system 175 may also guide cartons 12 onto and along conveyor system 135 that may extend from one end of robotic carton unloader 100 to the other end of robotic carton unloader 100. Conveyor system 135 may discharge unloaded cartons 12 at the end portion of robotic carton unloader 100 for collection (e.g., by laborers) or to a distribution center conveyor 19. Control and visualization system 180 may be provided to control and automate the unloading process, and to operate robotic carton unloader 100. Each of these components will be discussed in further detail below.

Mobile Body

Figure 2:
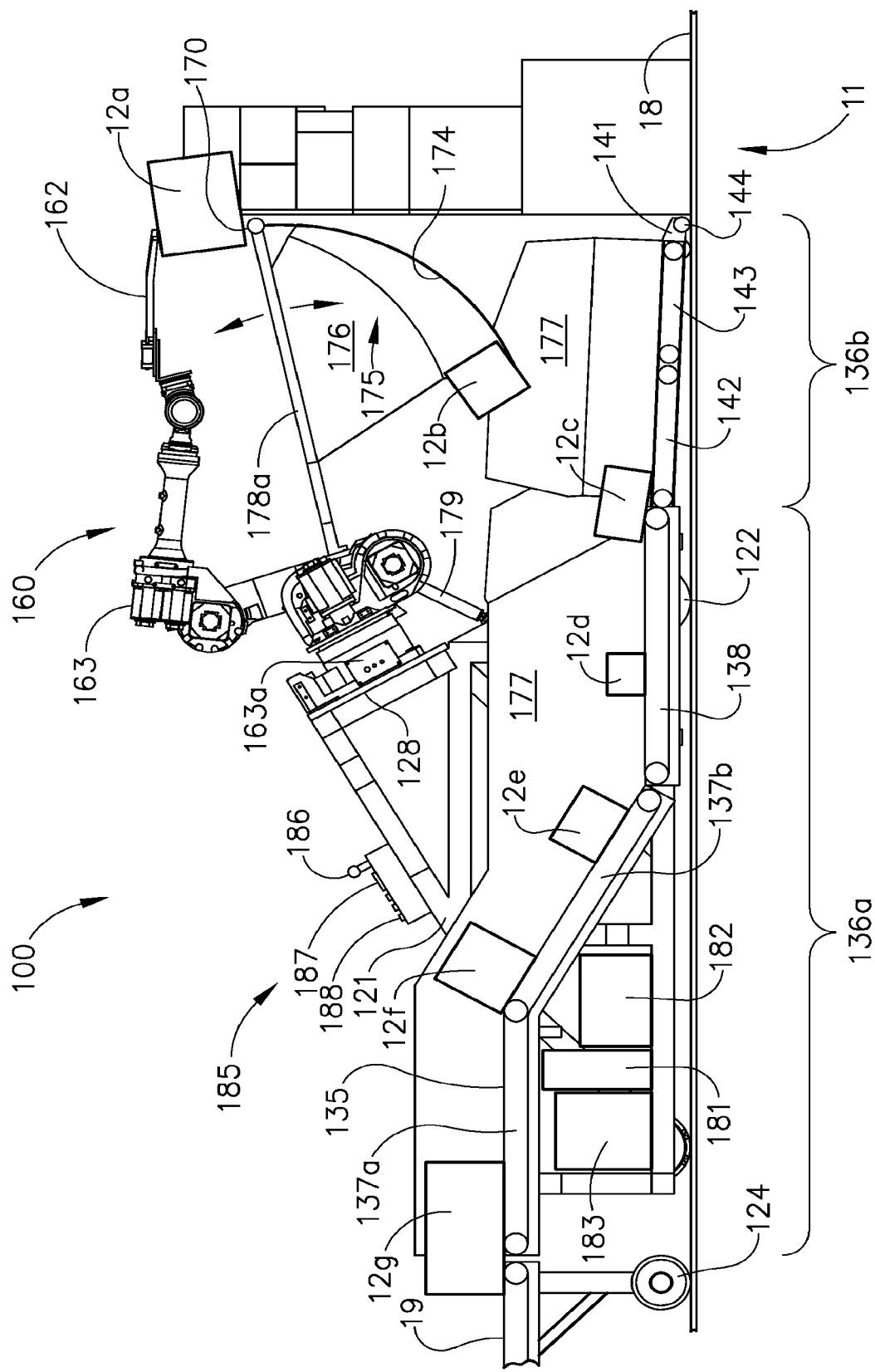
FIG. 2 is a side sectional view of the robotic carton unloader of FIG. 1 taken along line 2-2 of FIG. 1, showing a carton being unloaded from the pile of cartons and discharged onto an unloading dock conveyor.

As shown in FIGS. 1 and 2, mobile body 120 of robotic carton unloader 100 comprises chassis 121 movably supported on a four wheel configuration with each wheel 122, 123, 124, 125 adjacent to a corner of chassis 121. As an example, the chassis 121 may be a generally rectangular chassis with each wheel 122, 123, 124, and 125 adjacent to a corner or the rectangle. Angled plate 128 may be elevated above a central portion of conveyor system 135 and may extend across chassis 121 (e.g., transversely across chassis 121) for the attachment of robotically controlled carton remover system 160 thereto. A first drive motor and a second drive motor 127 (e.g., a drive system) may be generally located inboard from sides (e.g., the left side and the right side) of robotic carton unloader 100. The first drive motor may be configured to drive wheel 122, while second drive motor 127 may be configured to drive wheel 123. Other wheels, such as wheels 124, 125, may be configured to freewheel. Accordingly, drive motors, such as the first drive motor and the second drive motor 127, may drive and steer robotic carton unloader 100 within semi-trailer 10. As examples, rotating the first drive motor and the second drive motor 127 in the same direction may drive robotic carton unloader 100 forward or backward, rotating the first drive motor and the second drive motor 127 in opposite directions may pivot robotic carton unloader 100 about a point centered between drive wheels 122, 123, and rotating one of the first drive motor or the second drive motor 127 may pivot robotic carton unloader 100 about the opposite undriven drive wheel 122 or 123.

Conveyor System

As best seen in FIG. 2, conveyor system 135 includes a plurality of independently controlled conveyors to transport cartons 12. For example, the independently controlled conveyors may define an elongated "Z" shape conveyor system. In an embodiment, conveyor system 135 may be wider at the front (e.g., at the end of the conveyor closest to the carton pile 11) to receive cartons 12, and may narrow moving toward the rear (e.g., at the end of the conveyor farthest from the carton pile 11) along conveyor system 135. The narrowing of conveyor system 135 may position the unloaded cartons 12 in a line for discharge. Conveyor system 135 may comprise a rear portion 136a fixed relative to chassis 121, and a front portion 136b pivotally mounted to, and extending from, chassis 121. Rear portion 136a of conveyor system 135 may comprise a rear conveyor 137 and central conveyor 138. Rear conveyor 137 may comprise a portion 137a (e.g., a horizontal portion) that may be aligned with distribution center conveyor 19 for unloading cartons 12. Rear conveyor 137 may further comprise a portion 137b that is inclined to couple portion 137a with central conveyor 138. Central conveyor 138 may be positioned proximal (e.g., horizontal) to trailer floor 18 and may extend through chassis 121 from rear conveyor 137 to front portion 136b of conveyor system 135. Motor 139 may be coupled with rear conveyor 137 to drive rear conveyor 137, and motor 140 may be coupled to central conveyor 138 to drive central conveyor 138. As will be apparent to one with ordinary skill in the art in view of the teachings herein, any suitable number of motors 139, 140 may be used to drive conveyors 137, 138.

Conveyor arms 141 may pivotally extend (e.g., in a front direction toward the carton pile 11) from chassis 121 to support front portion 136b of conveyor system 135. Conveyor arms 141 may be rotatable about pivot 145. Front portion 136b of conveyor system 135 may comprise trailing conveyor 142 and leading conveyor 143. Conveyors 142, 143 may be positioned end-to-end between conveyor arms 141 to transport cartons 12 along conveyors 142, 143. Roller 144 may be positioned adjacent the distal end of leading conveyor 143 and may be configured to load cartons 12 onto leading conveyor 143. Roller 144 may be generally cylindrical and may extend transversely across an end of conveyor arms 141. Roller 144 may be powered by roller drive motor 147 coupled with conveyor arms 141. Leading motor 148 and trailing motor 149 are coupled with conveyor arms 141 to drive leading conveyor 143 and trailing conveyor 142 respectively.

Figure 3:
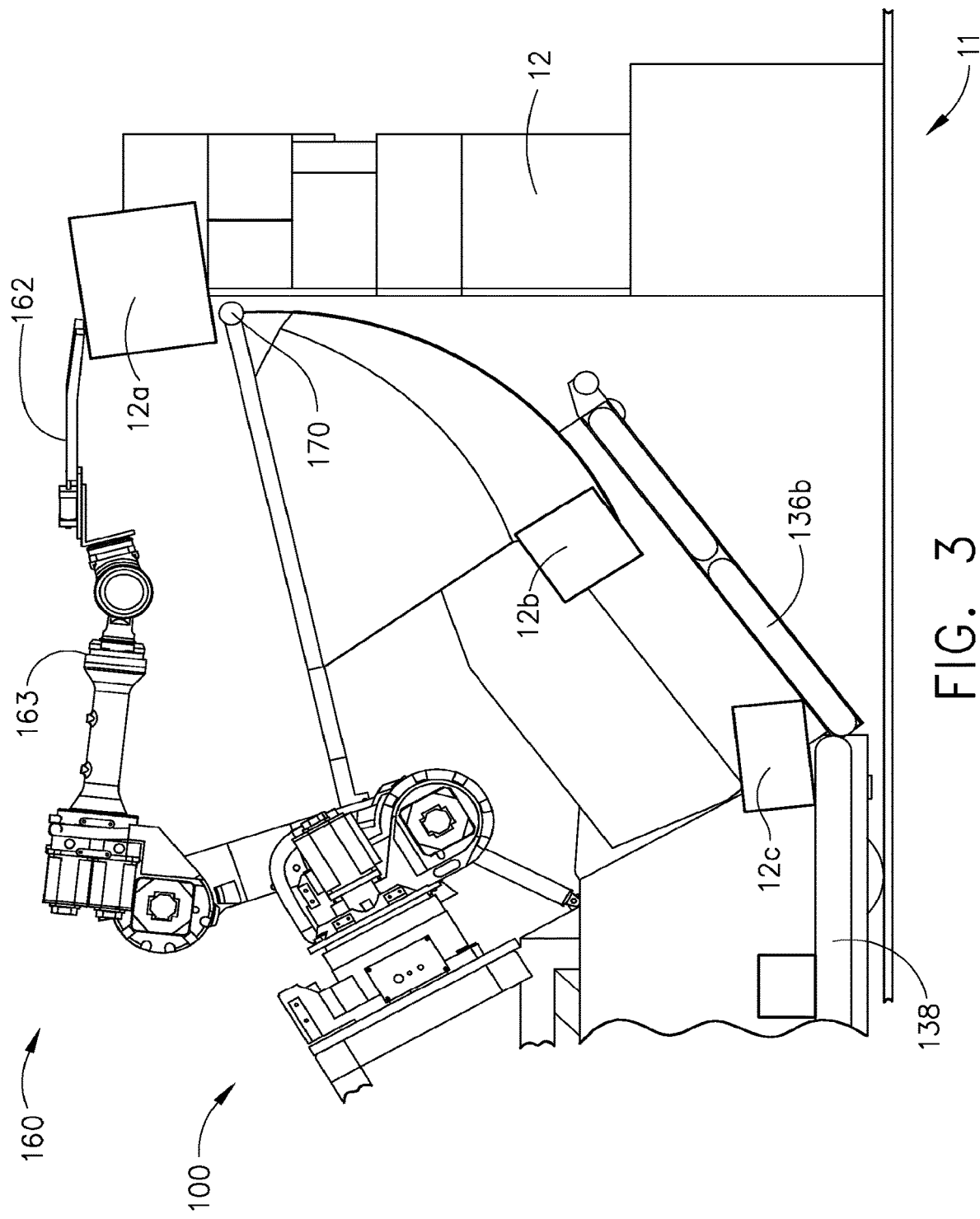
FIG. 3 is a partial side sectional view of the robotic carton unloader of FIG. 2, showing a portion of a conveyor system pivoted upwards.

Conveyor wheel 150 may be coupled with conveyor arms 141 to support front portion 136b on trailer floor 18. Lift 151 may operably connect between chassis 121 and conveyor arms 141 to lift the front portion 136b of conveyor system 135 off of the trailer floor 18 to any angular position relative thereto, such as but not limited to the angular position shown in FIG. 3. During operation, front portion 136b may be angled upwardly or downwardly relative to central conveyor 138. For instance, the angular position of front portion 136b may be adjusted to meet the changing height of carton pile 11. The front portion 136b may be angled to remain below the carton guide system 175. When carton pile 11 is at a maximum, the angular position is at a maximum, and when carton pile 11 is at a minimum, the angular position is at a minimum. As shown in FIG. 3, pivoting front portion 136b to an angular position may shorten the fall distance of carton 12 as it exits carton guide system 175 to fall or drop onto conveyor system 135. Lift 151 may be an electrical actuator such as a motor, but is not limited thereto.

Robotically Controlled Carton Remover System

Turning to FIGS. 1-4, robotically controlled carton remover system 160 may be configured to reach out (e.g., extend) from robotic carton unloader 100 to dislodge one or more cartons 12 (e.g., a plurality of cartons 12) from carton pile 11 with manipulator 162. As best seen in FIG. 3, manipulator 162 may be movably attached to a free end of robotic positioner 163. Base 163a of robotic positioner 163 is disposed adjacent angled plate 128 overlying central conveyor 138 of conveyor system 135. Robotic positioner 163 and manipulator 162 may be controlled by control and visualization system 180, and may be configured to dislodge or unload cartons 12 from anywhere on carton pile 11. The operating areas of robotic positioned 163 and manipulator 162 may extend from side-to-side and from floor-to-top of semi-trailer 10. Robotic positioner 163 may be any available robotic arm with five or six degrees of motion, such as the exemplary FANUC® Robot R-1000ia sold by FANUC® Robotics America Corporation, 3900 West Hamlin Road, Rochester Hills Mich. 48309-3253.

Figure 4:
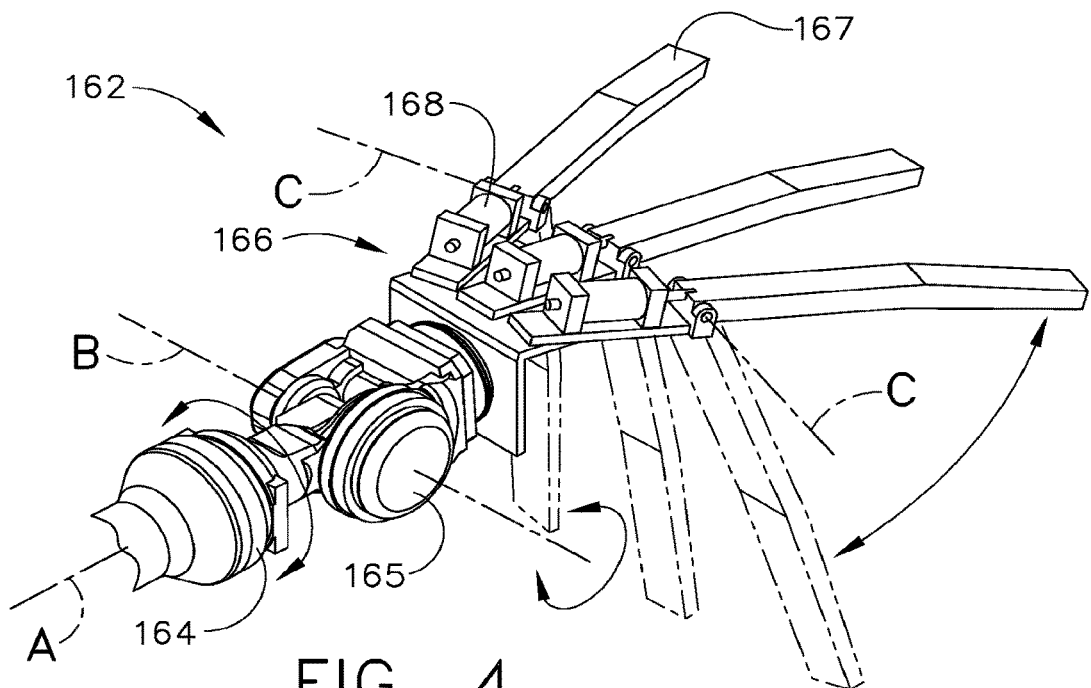
FIG. 4 is an isometric view of a manipulator of the robotic carton unloader of FIG. 1, showing movements of portions of the manipulator.
Figure 5:
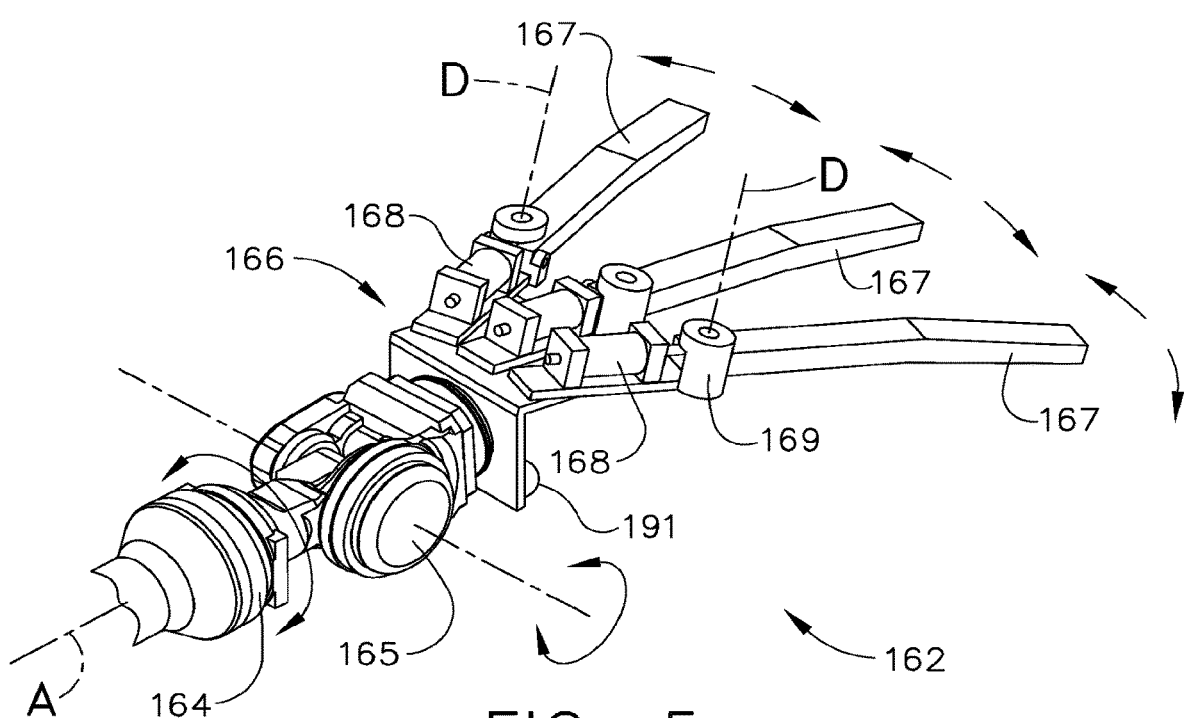
FIG. 5 is an isometric view of the manipulator of FIG. 4, showing a spreading movement of the manipulator.
Figure 6:
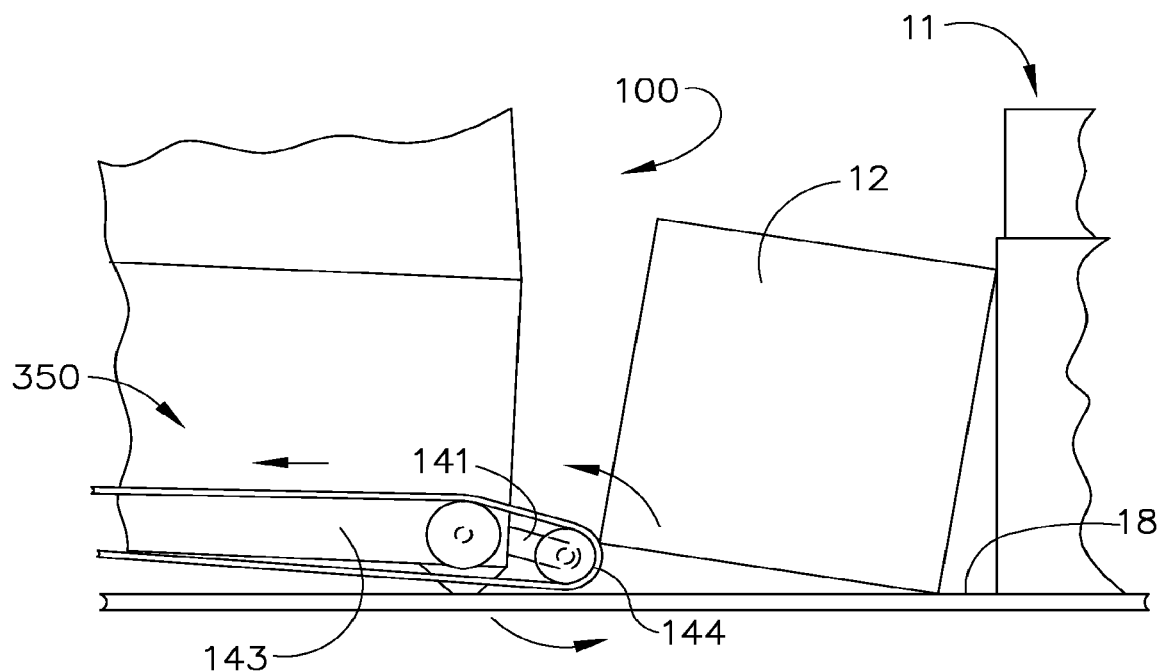
FIG. 6 is a partial side sectional view of the robotic carton unloader of FIG. 2, showing a rotating front roller lifting a carton from a floor of the truck.

As shown in FIG. 4, manipulator 162 may be rotatable about a wrist rotation joint 164 to rotate manipulator 162 about longitudinal axis A. Manipulator 162 may be further pivotable about wrist pivot joint 165 to pivot manipulator 162 about axis B oriented transverse to axis A. Manipulator 162 includes base 166 with at least one actuatable element, such as a claw 167 or finger, extending therefrom. As shown in this embodiment, base 166 may have two or more actuatable elements, such as three fingers 167, pivotally mounted to base 166 at their respective proximal ends. First actuator 168 may be connected to each actuatable element, such as each of fingers 167, to pivot fingers 167 downwardly relative to hand 166 about respective axes C, which is spaced from axis B as shown in FIG. 4. Second actuator 169 may be attached to hand 166 and to each of fingers 167 for spreading fingers 167 apart about axis D which is oriented transverse to axis C as shown in FIG. 5. First and second actuators 168, 169 may be, but are not limited to, electric or fluidic actuators. Fluidic actuators of the embodiments may operate with compressible fluids or with incompressible fluids.

Carton Guide System

Carton guide system 175 may be configured to guide unloaded or dislodged cartons 12 through robotic carton unloader 100, as shown in FIGS. 1 and 2. Carton guide system 175 may comprise a shelf 176, for example a carton deceleration skirt, located between carton remover system 160 and conveyor system 135. Shelf 176 comprises may comprise a surface 174. For example, the surface 174 may be a non-vertical surface, such as a curved surface. The shelf 174 may be configured to catch falling cartons 12 and guide the sliding dislodged cartons 12 onto conveyor system 135. Shelf 176 may be constructed from materials having a coefficient of friction configured to decelerate cartons 12 sliding thereon without stopping the sliding motion of cartons 12. Shelf 176 may be formed from various materials. As examples, shelf 176 may be formed from bendable or deflectable materials such as a fabric, a flexible plastic sheet, a pleated collapsible structure, etc. Carton guide system 175 may further comprise a pair of conveyor guides 177 positioned on each side of conveyor system 135. Conveyor guides 177 extend from conveyor arms 141 of front portion 136b of conveyor system 135 and may narrow toward at the rear portion 136a to guide cartons 12 onto conveyor system 135.

A frame 178 of carton guide system 175 may be pivotally attached to angled plate 128 of mobile body 120 (e.g., at a front side of angled plate 128 oriented toward the carton pile 11) such that carton guide system 175 extends outwardly from mobile body 120. In an embodiment, frame 178 may be generally U-shaped and may comprise a pair of frame arms 178a and 178b extending outwardly and spreading wider therefrom. Frame arms 178a and 178b may terminate at a cross member such as bumper 170 extending rigidly between frame arms 178a and 178b (e.g., from side to side at a front end closest to the carton pile 11). Bumper 170 may include outer cover 170a over a rigid core and may rotate. In one embodiment, at least a portion of bumper 170 may be a deflectable material such as an elastomer or a foam. Curved arrows are provided in FIG. 2 to show the directions of the pivotal motion of frame arms 178a, 178b relative to mobile body 120.

The previously described shelf 176 may be suspended from frame 178. Frame lift 179 may connect between the frame 178 and the angled plate 128 (see FIG. 1) to raise and lower frame 178, bumper 170, and shelf 176 (see arrows FIG. 2). Frame lift 179 can be an electrical actuator such as a motor but is not limited thereto. As will be described in greater detail later, frame lift 179 may place bumper 170 against the wall of carton pile 11 below cartons 12 being removed to stabilize the wall of carton pile 11 below the cartons 12 being removed. The deflection properties of shelf 176 may provide robotically controlled carton remover system 160 access to cartons 12 resting on trailer floor 18 when shelf 176 is lowered into contact with at least part of conveyor system 135 and collapses or reduces in height from the contact.

Control and Visualization System

Control and visualization system 180 may coordinate and control all of the functions of the systems of the robotic carton unloader 100. Control and visualization system 180 may be configured to operate robotic carton unloader 100 to automate at least a portion of the unloading process. Control and visualization system 180 may include control module 181, power supply 182, and robotics controller 183, positioned within chassis 121. Control and visualization system 180 provides timing, sequencing, homing routines, and motion control for drive motors 126, 127, conveyor drive motors 139, 140, 148, 149, roller drive motor 147, front lift 151, frame lift 179, robotic positioner 163 and manipulator 162.

Operator interface 185 may be coupled with chassis 121 and extends inwardly above a portion of conveyor system 135. Operator interface 185 may include joystick 186, display 187, and keypad 188. Joystick 186 may be a multipurpose control and can be configured to control movement of robotic positioner 163 and manipulator 162. Joystick 186 may be reconfigured (via selections on keypad 188) to steer, drive, and stop robotic carton unloader 100. Display 187 may display a wide variety of information that includes but is not limited to error messages, calibration information, status indicators, systems fault warnings, and can display lines of software code entered or edited on keypad 188. Keypad 188 may be used to enter software code for motion control of the robotic arm, conveyor system 135, drive motors 126, 127, lifts 151, 179, and conveyor drive motors 139, 140, 148, and 149.

Control and visualization system 180 may include visualization sensors such as a wall proximity sensor 193 for preventing robotic carton unloader 100 from colliding with the wall of carton pile 11. Wall proximity sensor 193 may be an electrical sensor attached to at least one of conveyor guides 177, such as at a front of the robotic carton unloader 100, for measuring proximity between the at least one proximity sensor 193 and carton pile 11. When wall proximity sensor 193 senses that robotic carton unloader 100 is at a desired distance from carton pile 11, control and visualization system 180 may stop robotic carton unloader 100.

Upper carton sensor 189 may be mounted on frame 178 to indicate contact of frame 178 with carton pile 11. Upper carton sensor 189 may be a contact switch adjacent to bumper 170 that trips when bumper 170 contacts the face of carton pile 11. Or, in another embodiment, upper carton sensor 189 may be a distance sensor that detects a distance to the face of carton pile 11. An angle position indicator may connect between angled plate 128 and frame 178 to indicate an angle between angled plate 128 and frame 178. When bumper 170 is contacting carton pile 11, the angle position indicator may provide control and visualization system 180 with angular positional data that can be used to compute the location of the wall of carton piles 11 relative to robotic carton unloader 100 and manipulator 162 of robotically controlled carton remover system 160. As an example, the angle position indicator may be a potentiometer.

Carton sensor 191 may be attached to base 166 of manipulator 162 (FIG. 5) so that the carton extraction or unloading area adjacent to manipulator 162 may be viewed or scanned. For instance, carton sensor 191 may measure the distance to a selected carton 12 so that manipulator 162 may be appropriately positioned to extract or unload the selected carton 12. In an alternate embodiment, carton sensor 191 may be a carton edge detector. A visualization sensor may be attached to angled plate 128 of chassis 121 for viewing the inside of semi-trailer 10, robotically controlled carton remover system 160 and cartons 12 within carton pile 11.

Operation

During operation, an operator may start robotic carton unloader 100 to initiate a startup and homing sequence to verify operation of the various systems and to move systems components to a home position. For example, control and visualization system 180 may undergo test routines to calibrate and home robotically controlled carton remover system 160, to pivot and position frame 178 behind a leading edge of robotic carton unloader 100, and to test activate conveyors of conveyor system 135. After the startup tests and homing routines are completed, the operator manually may select a drive selection on operator interface 185, and uses joystick 186 to steer and drive robotic carton unloader 100 into semi-trailer 10. Robotic carton unloader 100 may be advanced into semi-trailer 10 until the at least one proximity sensor 193 signals to the operator, via control and visualization system 180, that robotic carton unloader 100 is positioned adjacent to carton pile 11.

Upper carton sensor 189 may be used to identify a height and a front of carton pile 11, and control and visualization system 180 can use this information to position manipulator 162 adjacent to the identified position of carton pile 11. Carton sensor 191 on manipulator 162 may rescan carton pile 11 to refine the carton location data to ensure accurate selection and unloading of cartons 12.

FIG. 2 shows robotic carton unloader 100 unloading cartons 12 from semi-trailer 10 and the arrows are provided to show the paths of a plurality of cartons 12a-12h as they are unloaded from carton pile 11 and through robotic carton unloader 100. In FIG. 2, control and visualization system 180 selected carton 12a for unloading from carton pile 11 (e.g., the top of the carton pile 11), and robotically controlled carton remover system 160 is raking or dislodging carton 12a from carton pile 11.

Carton 12a may be tipped and drawn back by manipulator 162 towards shelf 176. Note that bumper 170 of carton guide system 175 may be pressed (e.g., deliberately) against carton pile 11 directly below carton 12a to stabilize carton pile 11 therebelow. Once the top row of cartons 12 is removed from carton pile 11, control and visualization system 180 can actuate frame lift 179 and possibly drive motors 126, 127 to reposition bumper 170 and carton guide system 175 against carton pile 11 below the new topmost row of cartons 12 slated for removal.

Turning back to FIG. 2, carton 12b is sliding down and off curved shelf 176 just prior to falling or dropping onto the moving conveyor system 135. Carton 12c is transiting from trailing conveyor 142 onto central conveyor 138 to join carton 12d traveling rearward thereon. Cartons 12e and 12f are moving upwards and rearwards along portion 137b of rear conveyor 137. Unloaded carton 12g is shown discharging from portion 137a of rear conveyor 137, and onto distribution center conveyor 19 for delivery into the distribution center. As the height of carton pile 11 is reduced, frame lift 179 may lower carton guide system 175 downward.

In an embodiment, when shelf 176 may be lowered into contact with conveyor system 135, shelf 176 may be operatively configured to deflect or collapse against conveyor system 135. This deflection or collapse may reduce the height of shelf 176, which may enable robotically controlled carton remover system 160 to reach over the collapsed shelf 176 to reach lower cartons 12. Once a dislodged lower carton 12 may be drawn onto the collapsed shelf 176, robotically controlled carton remover system 160 and shelf 176 may be raised to dump carton 12 onto conveyor system 135.

As described previously and best shown in FIG. 6, roller 144 may be located adjacent to conveyor system 135 and may be rotated by roller drive motor 147. As shown, roller 144 is cylindrical with a length and a circular cross section. Roller 144 is rotated in a direction that lifts any carton 12 upwardly when contacted by roller 144. Once lifted, the rotating roller 144 can draw carton 12 downstream onto roller 144 and onto moving conveyor system 135 for extraction. These processes may repeat as required until all of the cartons 12 are unloaded from semi-trailer 10.

Alternate Embodiments

Figure 7:
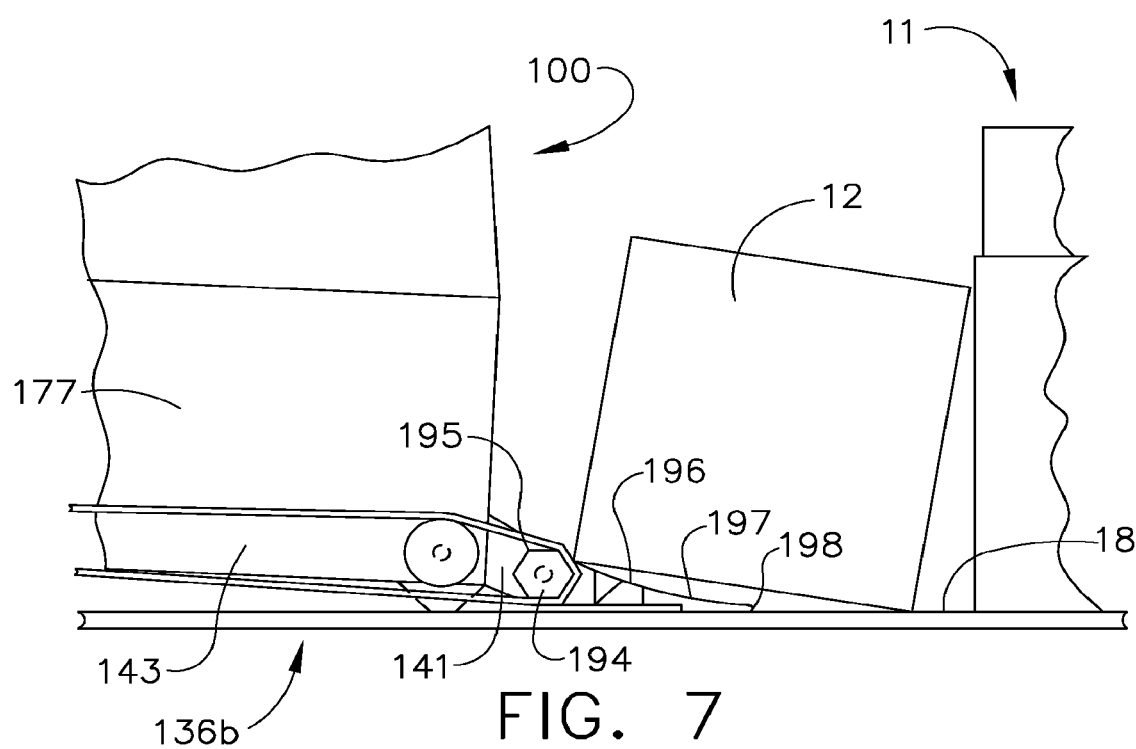
FIG. 7 is a partial side sectional view of an alternate embodiment of a robotic carton unloader having a roller with corners and a carton scoop.

FIG. 7 shows an alternate roller 194 having a length and a non-circular cross section such as a hexagonal cross section. Other suitable cross section configurations for roller 194 may be used, such as octagonal or ribbed cross section. The non-circular cross section extends lengthwise along roller 194 and is placed in front of conveyor system 135. Roller 194 may have a plurality of roller corners 195 extending lengthwise along the alternate roller 194 and when rotated, roller corners 195 create rotating ridges of high pressure that impact and dig into cartons 12. The combinations of upward rotating lines of pressure and impact have been proven to be effective in dislodging cartons 12.

FIG. 7 further includes carton scoop 196 extending from conveyor arms 141 frontwards of roller 194. Carton scoop 196 may be wedge shaped and at least a portion of carton scoop 196 can be a curve 197. Leading edge 198 of carton scoop 196 may be driven underneath carton 12 resting on floor 18. Carton scoop 196 may be configured to act as an inclined ramp that lifts and tilts carton 12 while moving underneath. As shown, the tilted carton 12 in FIG. 7 may have at least one edge thereof lifted off floor 18. Carton 12 then slides and rides up along carton scoop 196 until contacting rotating roller 194 to further lift and pull carton 12 downstream onto conveyor system 135. While carton scoop 196 is shown with roller 194, carton scoop 196 may, in another embodiment, also be used with roller 144. Additionally, in another embodiment, carton scoop 196 may be used without rollers 194 or 144 and can attach directly in front of moving conveyor system 135 (not shown).

While robotic carton unloader 100 is described above for unloading a semi-trailer 10, robotic carton unloader 100 of the present embodiment is not limited for use solely thereto, and is well suited for unloading cartons 12 in other settings such as within a store, a warehouse, a distribution center, an unloading bay, between product aisles, a rack, a pallet, and a freezer.

With respect to the actuators and lifts described as first and second actuators 168, 169 or frame lift 179, these actuators are not limited to electrical actuators, but can be a fluidic actuator operable with compressible or incompressible fluids such as air and oil.

The foregoing description of an embodiment has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention are explained in detail, it is to be understood that the invention is not limited in its scope to the details of construction and arrangement of components set forth in the preceding description or illustrated in the drawings. The invention is capable of other embodiments and of being practiced or carried out in various ways. Also, in describing the embodiment, specific terminology was used for the sake of clarity. It is to be understood that each specific term includes all technical equivalents which operate in a similar manner to accomplish a similar purpose. It is intended that the scope of this provisional filing will be better defined by the claims submitted with a later non-provisional filing.

What is claimed is:

1. A robotic carton unloader for unloading a carton pile, comprising:
    a conveyor system;
    a manipulator movably attached to a robotically controlled carton remover system via a robotic positioner, the robotically controlled carton remover system configured to extend from the robotic carton unloader to dislodge one or more cartons from the carton pile using the manipulator;
    a frame comprising a bumper configured to be pressed against the carton pile directly below the one or more cartons being dislodged from the carton pile by the manipulator;
    an electrical actuator connected to the frame and configured to raise and lower the frame; and
    a shelf attached to the frame and configured to catch the one or more cartons dislodged from the carton pile and guide the one or more cartons dislodged from the carton pile onto the conveyor system,
    wherein when one or more cartons are dislodged, the electrical actuator is configured to reposition the frame such that the bumper applies pressure directly below the one or more cartons being dislodged in order to further stabilize cartons below the bumper as the one or more cartons are dislodged.

2. The robotic carton unloader of claim 1, further comprising:
    a mobile body; and
    a drive system attached to the mobile body, the drive system including a plurality of wheels for driving and steering the mobile body, wherein the conveyor system, the manipulator, the robotic positioner, and the frame are coupled to the mobile body.

3. The robotic carton unloader of claim 2, further comprising: a conveyor lift operably connected to a chassis of the mobile body and configured to lift a front portion of conveyor system off a floor to one or more angular positions in accordance with a height of the carton pile.

4. The robotic carton unloader of claim 3, wherein the front portion of the conveyor system is supported by conveyor wheels.

5. The robotic carton unloader of claim 1, wherein the frame is pivotally attached to an angled plate of the mobile body, wherein a front side of the angled plate is oriented towards the carton pile.

6. The robotic carton unloader of claim 1, wherein the conveyor system further comprises conveyor arms comprising a rotating roller driven by a drive motor, the rotating roller configured to rotate in a direction to lift the one or more cartons upwardly when contacted by the rotating roller, and wherein the roller is in one of a non-circular cross section, a hexagonal cross section, an octagonal cross section and a ribbed cross section.

7. The robotic carton unloader of claim 6, wherein the conveyor arms further comprising a carton scoop to lift and tilt the one or more cartons when moving underneath the one or more cartons, the carton scoop is in contact with the rotating roller.

8. The robotic carton unloader of claim 1, further comprising a control and visualization system connected to the conveyor system, the manipulator, the robotic positioner, and the frame lift, wherein the control and visualization system is configured to automatically control the conveyor system, the manipulator, the robotic positioner, and the frame lift to unload the carton pile.

9. The robotic carton unloader of claim 1, further comprising:
    a first wrist rotation joint to rotate the manipulator about a first longitudinal axis with respect to the first wrist joint;
    a second wrist pivot joint to pivot the manipulator upward and downward about a second axis transverse to the longitudinal axis of the first wrist joint;
    a base with multiple claws, wherein an actuator connected the base and each individual claw allows each of the individual claw to spread and move sideways about a third axis defined by the actuator with respect to the base.

10. The robotic unloader of claim 9, wherein each individual claw further comprises a fluidic actuator.

11. The robotic unloader of claim 9, wherein each individual claw is pivotally attached to the base at a proximal end therof to pivot relative thereto.

12. The robotic unloader of claim 1, further comprises a carton sensor for viewing of unloading area adjacent to manipulator, the carton sensor configured to measure a distance to a selected carton.

13. A robotic carton unloader for unloading a carton pile, comprising:
    a conveyor system;
    a manipulator movably attached to a robotically controlled carton remover system via a robotic positioner, the robotically controlled carton remover system extending from the robotic carton unloader to dislodge one or more cartons from the carton pile using the manipulator;
    a frame comprising a bumper configured to be pressed against the carton pile directly below the one or more cartons being dislodged from the carton pile by the manipulator; and
an electrical actuator connected to the frame and configured to raise and lower the frame, wherein when one or more cartons are dislodged, the electrical actuator is configured to reposition the frame such that the bumper applies pressure directly below the one or more cartons being dislodged in order to further stabilize cartons below the bumper as the one or more cartons are dislodged.

14. The robotic carton unloader of claim 13, further comprising:
    a mobile body; and
    a drive system attached to the mobile body, the drive system including a plurality of wheels for driving and steering the mobile body, wherein the conveyor system, the manipulator, the robotic positioner, and the frame are coupled to the mobile body.

15. The robotic carton unloader of claim 13, wherein the frame is pivotally attached to an angled plate of the mobile body, wherein a front side of the angled plate is oriented towards the carton pile.

16. The robotic carton unloader of claim 13, wherein the conveyor system further comprises conveyor arms comprising a rotating roller driven by a drive motor, the rotating roller configured to rotate in a direction to lift the one or more cartons upwardly when contacted by the rotating roller, and wherein the roller is in one of a non-circular cross section, a hexagonal cross section, an octagonal cross section and a ribbed cross section.

17. The robotic carton unloader of claim 16, wherein the conveyor arms further comprising a carton scoop to lift and tilt the one or more cartons when moving underneath the one or more cartons, the carton scoop is in contact with the rotating roller.

18. The robotic carton unloader of claim 14, further comprising:
   a conveyor lift operably connected to a chassis of the mobile body and configured to lift the front portion of conveyor system off a floor to one or more angular positions in accordance with a height of the carton pile.

19. The robotic carton unloader of claim 13, wherein the front portion of the conveyor system is supported by conveyor wheels.

* * * * *